US011341584B1

(12) United States Patent
Farquhar Maniece (10) Patent No.: US 11,341,584 B1
(45) Date of Patent: May 24, 2022

(54) VIRTUAL-IMAGERY AND VIDEO-BASED SOCIAL MEDIA NETWORKING SYSTEM THAT CONNECTS INDIVIDUALS, BUSINESSES, PROFESSIONALS, AND CONSUMERS THROUGH VIRTUAL IMAGERY

(71) Applicant: Celina Michelle Farquhar Maniece, Duluth, GA (US)

(72) Inventor: Celina Michelle Farquhar Maniece, Duluth, GA (US)

( * ) Notice: Subject to any disclaimer, the term of this patent is extended or adjusted under 35 U.S.C. 154(b) by 284 days.

(21) Appl. No.: 16/387,351

(22) Filed: Apr. 17, 2019

Related U.S. Application Data (60) Provisional application No. 62/658,812, filed on Apr. 17, 2018.

(51) Int. Cl.
| | | |
|---|---|---|
| *G06F 15/16* | (2006.01) | |
| *G06Q 50/00* | (2012.01) | |
| *H04N 21/278* | (2011.01) | |
| *H04N 21/858* | (2011.01) | |
| *H04L 51/52* | (2022.01) | |
| *H04L 67/10* | (2022.01) | |
| *H04N 21/44* | (2011.01) | |
| *H04N 21/4788* | (2011.01) | |

(52) U.S. Cl.
CPC ............. *G06Q 50/01* (2013.01); *H04L 51/32* (2013.01); *H04L 67/10* (2013.01); *H04N 21/278* (2013.01); *H04N 21/44* (2013.01); *H04N 21/4788* (2013.01); *H04N 21/8586* (2013.01)

(58) Field of Classification Search
USPC ................................ 709/201, 202, 203, 217
See application file for complete search history.

(56) References Cited

U.S. PATENT DOCUMENTS

| | | | | |
|---|---|---|---|---|
| 8,867,106 | B1 * | 10/2014 | Lancaster | ............ H04N 1/3871 |
| | | | | 358/1.15 |
| 9,848,235 | B1 * | 12/2017 | Chen | ....................... G06F 16/00 |
| 11,037,129 | B1 * | 6/2021 | Chen | ..................... G06Q 20/40 |
| 2015/0016661 | A1 * | 1/2015 | Lord | .................. H04N 21/2668 |
| | | | | 382/100 |
| 2018/0012245 | A1 * | 1/2018 | Parker | ............... G06Q 30/0253 |
| 2018/0129512 | A1 * | 5/2018 | Singh | ..................... G06F 3/0483 |
| 2020/0184278 | A1 * | 6/2020 | Zadeh | .................. G06F 16/953 |
| 2021/0014575 | A1 * | 1/2021 | Selfors | ................... G09B 19/06 |
| 2021/0182977 | A1 * | 6/2021 | Dareshani | .............. G06Q 30/06 |

* cited by examiner

*Primary Examiner* — Lan Dai T Truong
(74) *Attorney, Agent, or Firm* — Plager Schack LLP; Mark H. Plager; Stephen Hallberg (57) ABSTRACT

A virtual-imagery and video-based social media networking system is disclosed that connects individuals, businesses, professionals, and consumers through virtual imagery. The virtual-imagery and video-based social media networking system provides two video feeds including a first connection-based video feed and a second non-connection based video feed. The two video feeds increases virtual exposures to non-connections. The virtual-imagery and video-based social media networking system expedites traffic to offerings of non-connection entities, such as virtual products, services, locations, websites, job announcements, talents, company tours, advice, elevator pitches, and consumer reviews. In this way, the user driven reward/incentive feature of the virtual-imagery and video-based social media networking system allows all users to have the ability to gain and increase exposure at minimum or no cost.

9 Claims, 6 Drawing Sheets

VIRTUAL-IMAGERY AND VIDEO-BASED SOCIAL MEDIA NETWORKING SYSTEM THAT CONNECTS INDIVIDUALS, BUSINESSES, PROFESSIONALS, AND CONSUMERS THROUGH VIRTUAL IMAGERY

CLAIM OF BENEFIT TO PRIOR APPLICATION

This application claims benefit to U.S. Provisional Patent Application 62/658,812, entitled "A VIDEO-BASED SOCIAL MEDIA NETWORKING SYSTEM THAT CONNECTS INDIVIDUALS, BUSINESSES, PROFESSIONALS AND CONSUMERS THROUGH VIRTUAL IMAGERY," filed Apr. 17, 2018. The U.S. Provisional Patent Application 62/658,812 is incorporated herein by reference.

BACKGROUND

Embodiments of the invention described in this specification relate generally to social media systems, and more particularly, to a video-based social media networking system that connects individuals, businesses, professionals, and consumers through virtual imagery.

Presently, eighty percent (80%) of the United States is built on entrepreneurship although a high volume of start-ups go out of business within five years of starting the business. This is a result of, but not limited to, lack of cash flow and exposure support inclusive of excessive marketing expenditures and high turnover.

Currently, social media platforms do not support social marketing inclusive of private and public virtual responses with both financial and non-financial user driven rewards, incentives and in-app/site tipping designed to drive exposure, marketing initiatives and sales.

Therefore, what is needed is a way to support social marketing inclusive of private and public virtual responses with both financial and non-financial user driven rewards, incentives, and tipping designed to drive exposure, marketing initiatives, and sales.

BRIEF DESCRIPTION

A novel virtual-imagery and video-based social media networking system that connects individuals, businesses, professionals, and consumers through virtual imagery is disclosed. In some embodiments, the virtual-imagery and video-based social media networking system expedites traffic and increases virtual exposures to offerings of non-connection entities by providing a platform that supports connection-based and non-connection-based video feeds.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel virtual-imagery and video-based social media networking system that connects individuals, businesses, professionals, and consumers through virtual imagery. In some embodiments, the virtual-imagery and video-based social media networking system expedites traffic to offerings of non-connection entities. In some embodiments, the virtual-imagery and video-based social media networking system provides two video feeds including a first connection-based video feed and a second non-connection based video feed. In some embodiments, the two video feeds increase virtual exposures to offerings of non-connection entities. Examples of offerings of non-connection entities include, without limitation, virtual products, services, locations, websites, job announcements, talents, company tours, advice, elevator pitches, and consumer reviews. In this way, the user driven reward/incentive feature of the virtual-imagery and video-based social media networking system allows all users to have the ability to gain and increase exposure at minimum or no cost.

As stated above, entrepreneurship is a huge economic driver in the United States. However, a high percentage of start-ups go out of business within the first five years of their existence, which is largely, but not exclusively, due to lack of cash flow and exposure support, as well as excessive marketing expenditures and high turnover. Embodiments of the virtual-imagery and video-based social media networking system described in this specification solve such problems by streamlining the hiring process, reducing high turnover, increasing exposures, and expediting marketing initiatives through virtual interactions and both financial and non-financial user driven rewards, incentives, and in-app/site tipping. In some embodiments, the virtual-imagery and video-based social media networking system centralizes the ability to have fun, video edit, socially network, market, recruit, and hire. In some embodiments, the virtual-imagery and video-based social media networking system allows users to clip daily activities and talents. In some embodiments, the virtual-imagery and video-based social media networking system allows businesses to virtually clip a company tour of a specific product, service, or promotion they are running for a period of time (e.g., a one-week promotion or special). In some embodiments, the virtual-imagery and video-based social media networking system allows businesses to streamline their hiring process by clipping the role in order to showcase potential job opportunities. In some embodiments, the virtual-imagery and video-based social media networking system allows professionals to visually respond to job announcements. In some embodiments, the virtual-imagery and video-based social media networking system allows consumers to have fun by clipping things they do and/or products/services they purchase or pay for. In short, the virtual-imagery and video-based social media networking system is for everyone and allows all users the possibility to benefit. In particular, individuals, professionals, consumers, and businesses will be incentivized by each other to assist with marketing and promotion initiatives. In some embodiments, the virtual-imagery and video-based social media networking system provides user driven financial and non-financial rewards, incentives, and in-app/site tipping options for interested users who are willing to re-share/create clips and reviews of requesting parties, thereby ensuring mutually beneficial outcomes for individuals, professionals, consumers, and businesses. For instance, an entity (individual, business, etc.) will be able to increase exposures and engagements by getting in front of their supporter, exposer, endorser, or ambassador (or other network connections) at no or minimum cost while driving people, connections, sales, and traffic to them and to what they do.

Embodiments of the virtual-imagery and video-based social media networking system described in this specification differ from and improve upon currently existing options. In particular, some embodiments differ from existing social media platforms that rely on friend-based connections and algorithms, which can limit exposures and the ability to virtually find new products, services, job opportunities, talent, and businesses. In contrast to existing social media platforms, the virtual-imagery and video-based social media networking system does not require friend-based connections and can be seen by anyone who utilizes the app/website, thereby increasing ones exposure and awareness. Furthermore, the virtual-imagery and video-based social media networking system provides both financial and non-financial rewards, incentives, in-app/site tipping features, and video editing options, in order to offer a complete set of incentivizing features to all users.

In addition, some embodiments of the virtual-imagery and video-based social media networking system improve upon the currently existing social media platform apps that require users to run boosted promotions with the hopes of reaching an intended target audience. In practice, such promotion-based options are more prone to missing new potential clients because they are not shown to individuals with no previous algorithm indicated interest. In other words, new potential consumers are bypassed. Furthermore, other platforms lack user driven rewards, incentives, and in-app/site tipping, preventing one from gaining user driven exposure through being featured to another supporting users connections within the app and website with (reward driven) shareable options to other social networks/platforms. In contrast, the virtual-imagery and video-based social media networking system provides two feeds, including one feed that is connection based (My Biz) and another feed that is non-connection based (Your Biz), thereby increasing ones virtual exposures to non-connections. As a result, the virtual-imagery and video-based social media networking system expedites traffic to the individual's virtual products, services, locations, websites, job announcements, talents, company tours, advice, elevator pitches, or consumer reviews. In this way, all users will have the ability to gain and increase exposure at minimum or no cost.

The virtual-imagery and video-based social media networking system of the present disclosure may be comprised of the following elements. This list of possible constituent elements is intended to be exemplary only and it is not intended that this list be used to limit the virtual-imagery and video-based social media networking system of the present application to just these elements. Persons having ordinary skill in the art relevant to the present disclosure may understand there to be equivalent elements that may be substituted within the present disclosure without changing the essential function or operation of the virtual-imagery and video-based social media networking system.

I. Home Login Page

Transparent, feature looped video in the background of the home page (plays with or without sound until user clicks on it).

Login fields (username/password for only first time users via app or website, alternative third party validated login, etc.).

Paid looped advertisement slots on three options on the page, including option 1 which, in a small window, would highlight clips of different businesses, option 2 which, in a small window, would highlight various consumers and option 3 which, in a small window, would highlight various professionals.

II. Main Page/Profile

In the main page/profile, there is a Search/Filter present in the top right corner through which a user can search by city/state, business, consumer, professional, and/or industry.

There is also a host-featured business of the month (displayed, for example, on the top of the screen as a looped video).

Featured clips are displayed underneath the main clip in a plurality of different windows in which ad space will be featured for businesses, consumers, and professionals.

Posting of user clips and/or highlights shown in a double infinite scroll whereby individuals can post content related (in "My Videos") to general, businesses, consumers, and professionals. The ability of users to enjoy the clips and highlights are further enhanced by a view option (with an indicator that reflects the number of views the clip/highlight received and which shows the number of views), a share options (which includes the option to email and share on other social media platforms), a like option (with an indicator that allows people to like it and which shows the number of likes), a video response and reply section which includes a bubble indicator to reflect a video response option and which is public or private, a global redirection to a website or a URL, a comment/reply section which shows the number of comments and which is public or private, and Ad Space.

III. What we would Like to Know from/about Our Users

The information about users is obtained by options for document attachments.

IV. Create an Account Page

Includes a drop down box for posting options, General, Business, Professional, and Consumer.

V. Business Users or General Users Home Page

All users on this page are provided user driven financial and non-financial rewards, incentives, and in-app/site tipping options, a rating scale that supports user driven rewards, incentives and in-app/site tipping, video editing, product purchase option shopping cart for items, products, or services, a private messages section, a notification and emails section, a setting section, and sections for About Us, Contract Us, and FAQ, as well as options to invite & share with friends, an All Users tab, and an All Businesses tab.

The various elements of the virtual-imagery and video-based social media networking system of the present disclosure may be related in the following exemplary fashion.

It is not intended to limit the scope or nature of the relationships between the various elements and the following examples are presented as illustrative examples only. Navigation through the site can provide the options and features outlined above, thereby allowing businesses, consumers, and professionals to obtain basic statistical insights, such as total number of views, likes, video responses, and shares (with an option to make their views public to others or keep private). One may navigate and utilize the app (via mobile device installation of mobile app) and/or website. Also, users can use their mobile device (e.g., tablet, smartphone, etc.) and/or webcam to record and upload. If the basic method of navigation fails effective utilization can still be achieved and reached through various navigation options. (Steps 24-35) enhances user functionality and exposure of all users regardless of category.

The video upload option also can be enhanced with textual information. In some embodiments, an allowance is made for text related to a video based on the time of the video. For example, a video that is 30-60 seconds and are designated as main clips can have 130-2,000 character word option.

Another feature is that businesses can sell products/services directly from site inclusive of a shopping cart. For all users, the system supports financial and non-financial user driven rewards, incentives, and in-app tipping to support interactive user marketing. A rating scale is another feature that supports user driven rewards, incentives and in-app tipping. Video editing is a post-upload feature that allows users to capture raw video from a camera (mobile device embedded camera or web cam) and then edit the raw video after uploading to the site. More features of the system are supported, including features which allow all users to send requests to their email and phone contacts to add them in connection with their site profile.

Watching videos is further enhanced by scaled viewing in which videos will expand to a larger regular viewing screen when clicked. As an interactive feature, the interactive component will be called Expose It, Clip, Highlight, Market, or Advertise, but the functionality is the same regardless of the naming convention chosen. Overall, the more connections a user has, the more the user can gain and benefit. As a conceptual 'level' example: a user may be considered a Supporter with 0-1000 connections, while the user would be considered an Exposer with 1000-5000 connections, would be an Ambassador with 5000-10,000 connections, and would be considered an Endorser with 10,000-20,000+ connections.

The virtual-imagery and video-based social media networking system of the present disclosure may work generally by utilizing and following the above listed steps. And through the functionalities listed, exposures can be increased, thereby allowing all users the ability to benefit. Specifically, the user login begins with the simplest way to access, navigate and utilize the application and website. Users have the ability to virtually create, post and find clips that helps one gain exposure as individuals, businesses, professionals and consumers. Driving people, connections, traffic, and sales to them and what they do.

To make the virtual-imagery and video-based social media networking system of the present disclosure, one may design, code, and build a software system and network architecture on which to deploy the virtual-imagery and video-based social media networking system. Implementation of innovative concepts that address areas of need will be a continuous on going process that will be provided to and supported developers. Functionality will be continuously tested through development team and later presented to beta testers to ensure functionality and utilization operates in the best way possible. The flow and navigation of the application and website can be shuffled, interchanged, and reconfigured but still resulting in increasing exposure of all users with providing them the ability to benefit from the virtual-imagery and video-based social media networking system.

To use the virtual-imagery and video-based social media networking system of the present disclosure, one may follow the above listed steps and features to centralize and expedite exposures while driving traffic and awareness of ones talents, products, and services. Increased marketing initiatives and employment will be heightened through ones ability to visually see, find, and post virtual products, services, job opportunities, and talents while quickly gaining through assisting others with their promotional/marketing needs in exchange for rewards, incentives and in-app/site tips.

Figure 1:
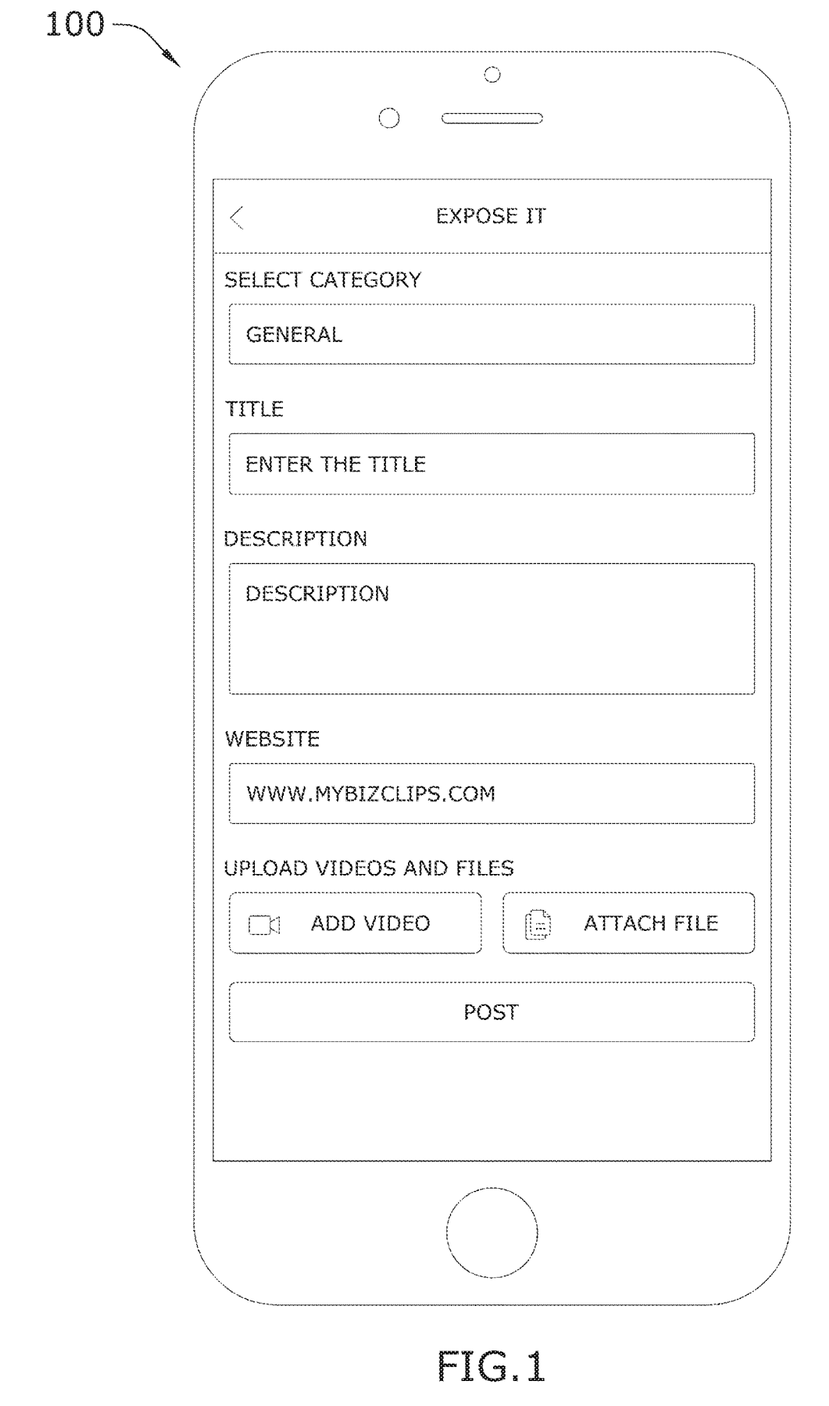
FIG. 1 conceptually illustrates a mobile app user interface (UI) and posting tool to virtually expose an offering by way of a virtual-imagery and video-based social media networking system in some embodiments.
Figure 2:
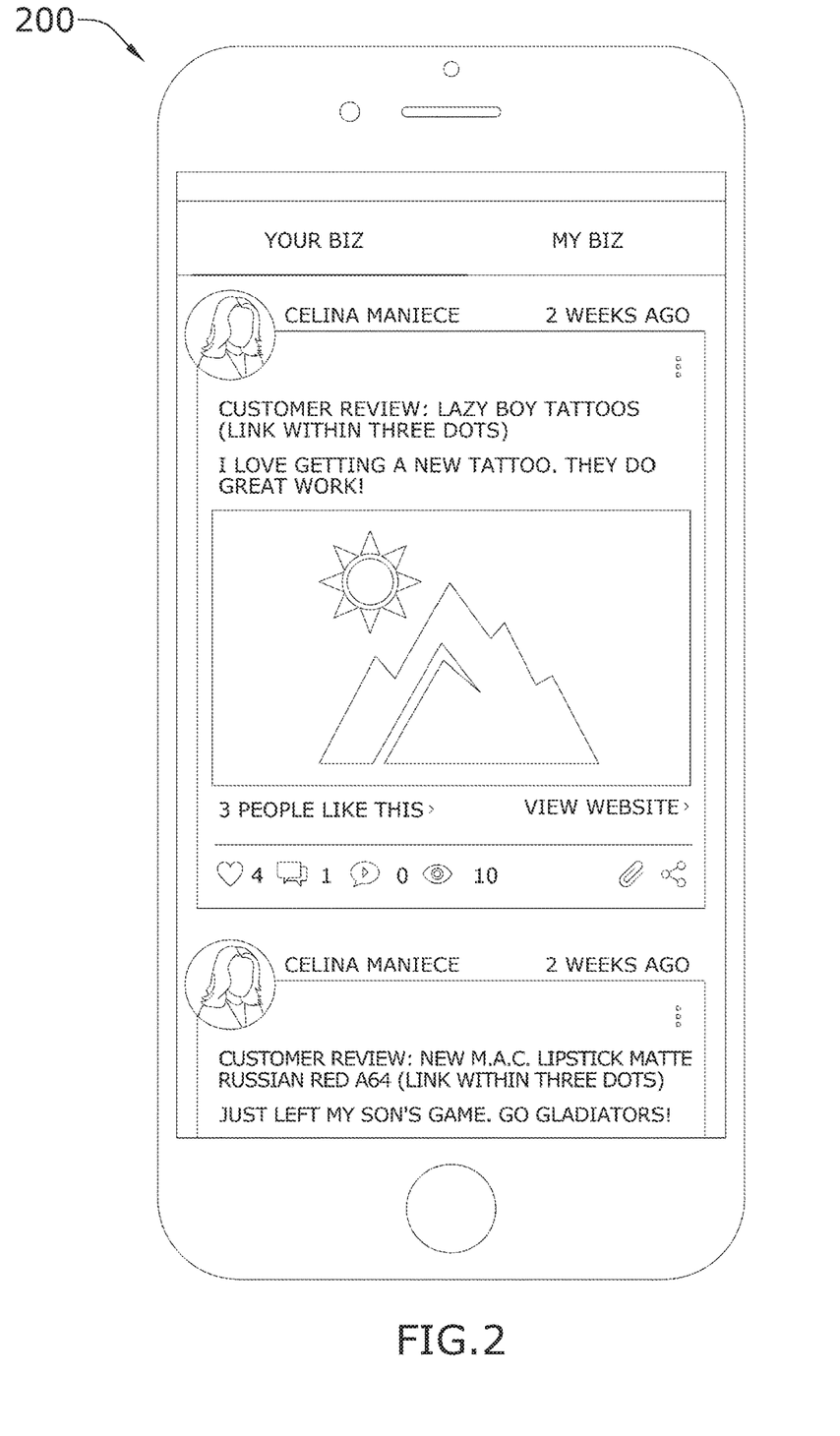
FIG. 2 conceptually illustrates exemplary exposures within the mobile app UI with feeds of both connected and non-connected users.
Figure 3:
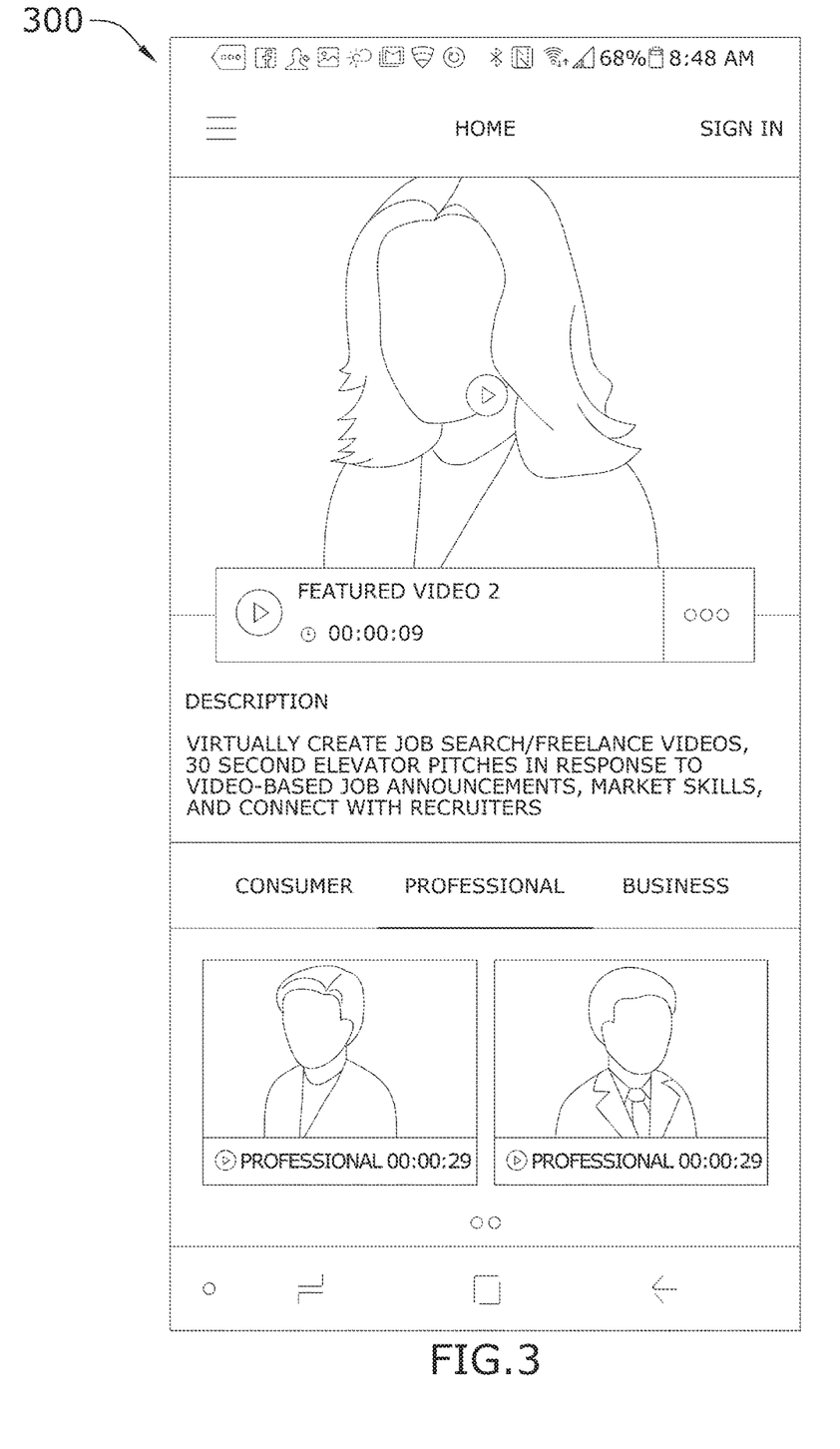
FIG. 3 conceptually illustrates a featured video feed exposed by way of a virtual-imagery and video-based social media networking system in some embodiments.
Figure 4:
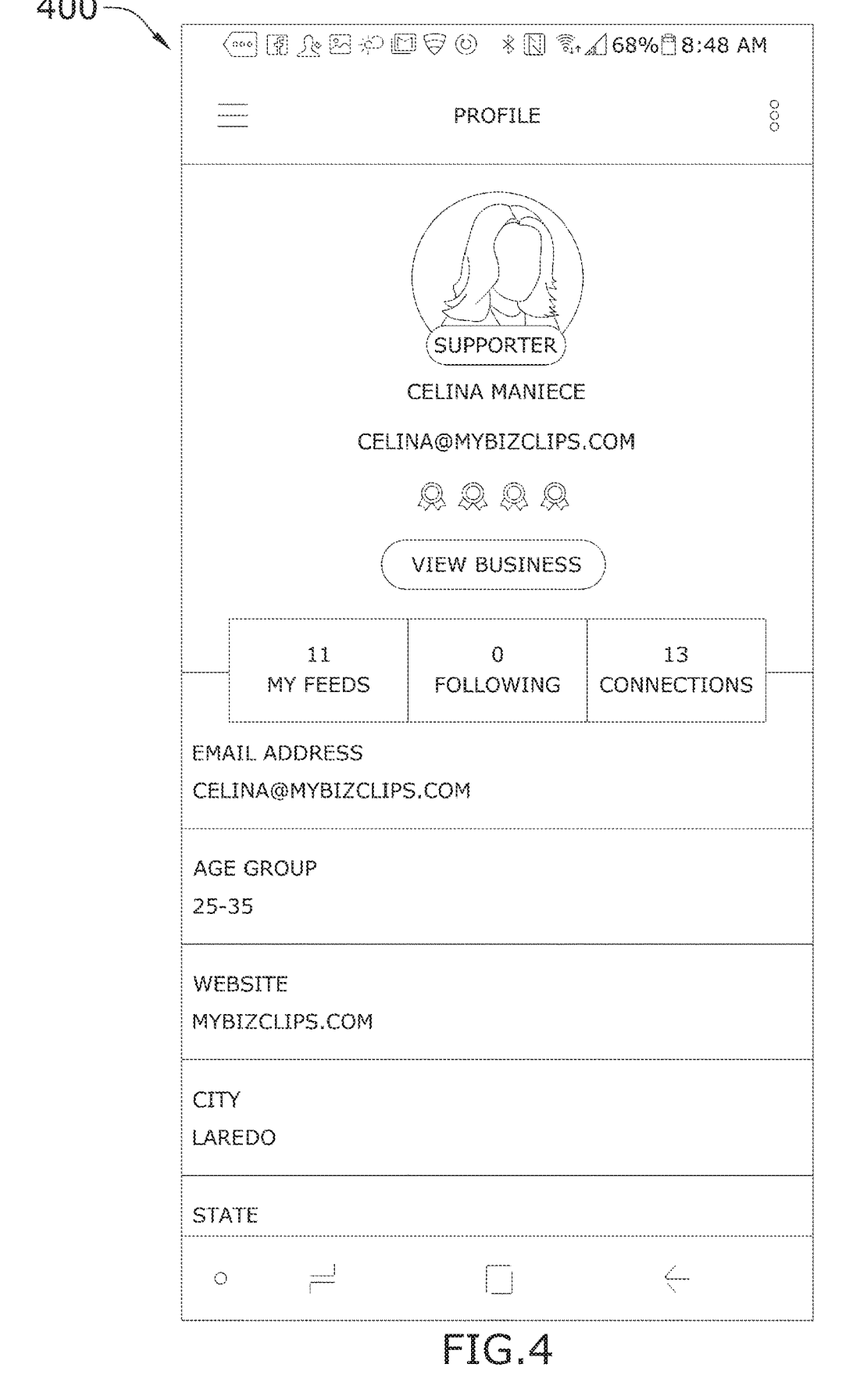
FIG. 4 conceptually illustrates an exemplary profile of a user of the virtual-imagery and video-based social media networking system in some embodiments.

Furthermore, one may use the virtual-imagery and video-based social media networking system by using a mobile device with a mobile app that implements tools and features for accessing, creating and exposing content, viewing exposures of others, and otherwise using the virtual-imagery and video-based social media networking system. To demonstrate, FIGS. 1-4, which are described next, show exemplary user interfaces and tools of such a mobile app. Specifically, FIG. 1 conceptually illustrates a mobile app user interface (UI) and posting tool to virtually expose an offering 100 by way of a virtual-imagery and video-based social media networking system on an exposure posting page. Turning to another example, FIG. 2 conceptually illustrates exemplary exposures within the mobile app UI with feeds of both connected and non-connected users 200 shown on the main page of a particular user. Now in another example, FIG. 3 conceptually illustrates a featured video feed exposed 300 by way of a virtual-imagery and video-based social media networking system and shown on the home login page. Rounding out these mobile app UI examples, FIG. 4 conceptually illustrates an exemplary profile 400 of a user of the virtual-imagery and video-based social media networking system shown on the profile page of a particular user.

Figure 5:
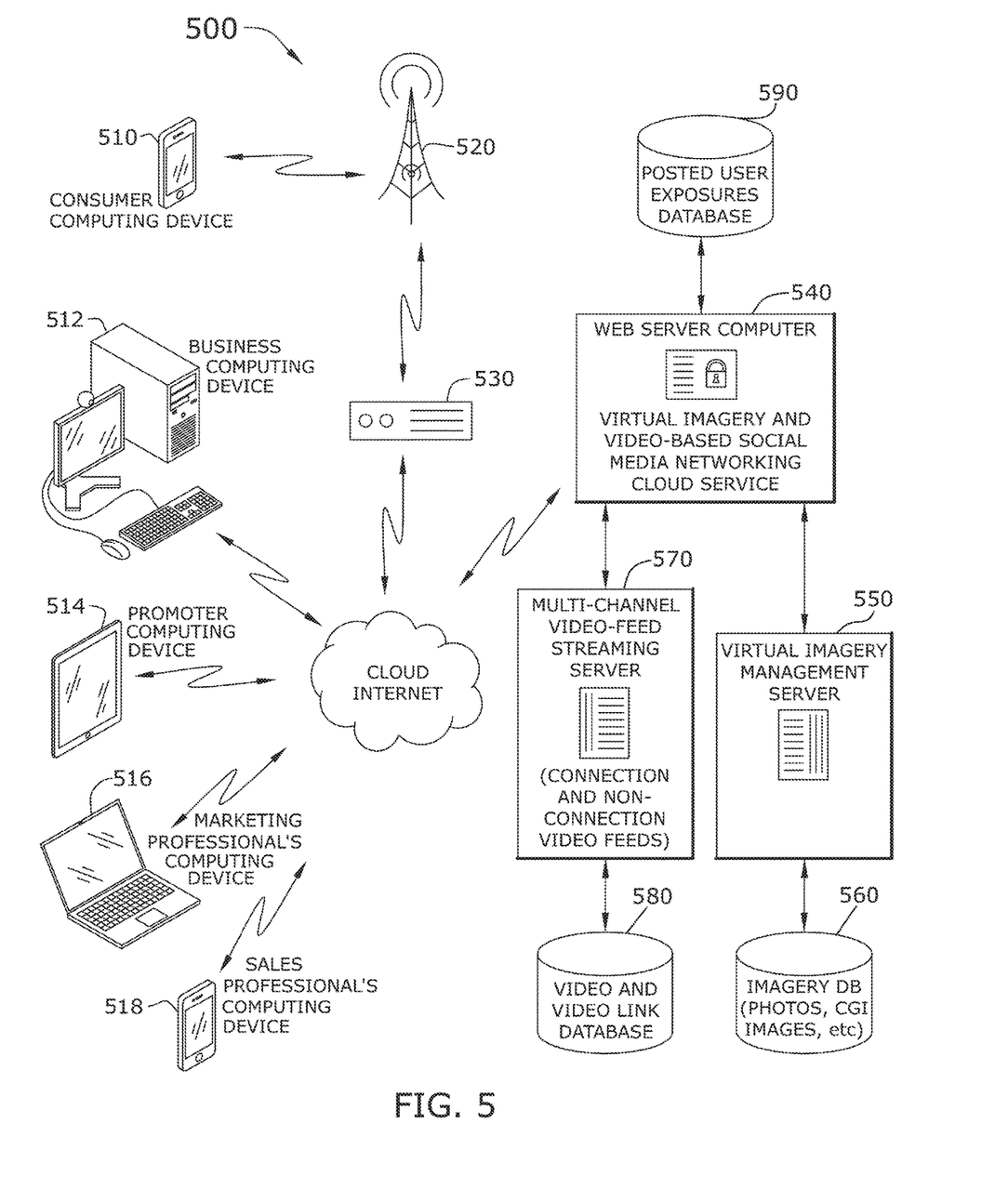
FIG. 5 conceptually illustrates a network architecture of a virtual-imagery and video-based social media networking system that provides a cloud service for connecting individuals, businesses, professionals, and consumers through virtual imagery.

While the mobile app UI examples, described above by reference to FIGS. 1-4, demonstrate some ways a user can interact with the virtual-imagery and video-based social media networking system, FIG. 5 conceptually illustrates a network architecture of a virtual-imagery and video-based social media networking system 500 that provides a cloud service for connecting individuals, businesses, professionals, and consumers through virtual imagery.

As shown in this figure, the virtual-imagery and video-based social media networking system 500 includes a consumer mobile device 510, a business computer 512, a promoter tablet computing device 514, a marketing professional's laptop computer 516, and a sales professional's mobile device 518. The virtual-imagery and video-based social media networking system 500 also includes a wireless communication point 520 (e.g., a cell tower for cellular data communication), a gateway 530, a web server 540 that hosts a virtual-imagery and video-based social media networking service, a virtual imagery management server 550, an imagery database 560, a multi-channel video-feed streaming server 570, a video and video link database 580, and a posted user exposures database 590. The mobile app UI pages, described above by reference to FIGS. 1-4, and other exemplary mobile app UI pages are visually output onto screens of the consumer mobile device 510, the business computer 512, the promoter tablet computing device 514, the marketing professional's laptop computer 516, and the sales professional's mobile device 518 when connected to the web server 540 that hosts a virtual-imagery and video-based social media networking service. Virtual imagery is also retrieved, when connected to the web server 540, from the imagery database 560 via the virtual imagery management server 550. Additionally, when connected to the web server 540, connection-based and non-connection-based videos are retrieved from the video and video link database 580 via the multi-channel video-feed streaming server 570. When an end-user chooses to post an exposure, such as a video feed, an image, or some textual information, the videos and/or images are stored in either or both of the imagery database 560 and the video and video link database 580, while textual information and indexed references to posted videos and/or images are stored in the posted user exposures database 590.

In this specification, the term "software" is meant to include applications stored in magnetic storage, which can be read into memory for processing by a processor. In some embodiments, the software, when installed to operate on one or more electronic systems, define one or more specific machine implementations that execute and perform the operations of the software. In particular, the processes described above may be implemented as software processes that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

Figure 6:
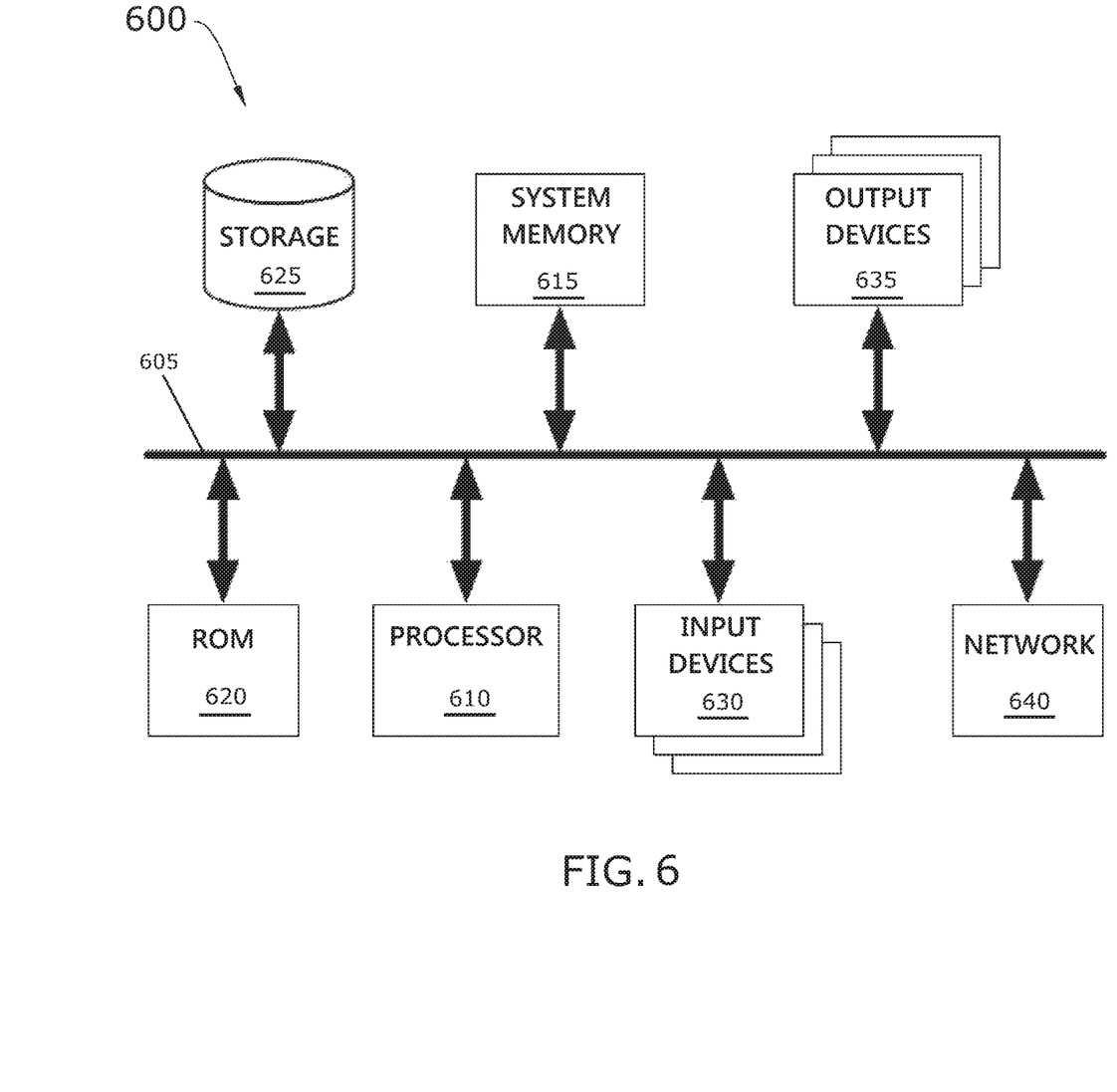
FIG. 6 conceptually illustrates an electronic system with which some embodiments of the invention are implemented.

By way of example, FIG. 6 conceptually illustrates an electronic system 600. The electronic system 600 may be any computing device, such as a desktop or laptop computer, a tablet, a smart phone, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The above-described embodiments of the invention are presented for purposes of illustration and not of limitation.

I claim:

1. A virtual-imagery and video-based social media networking system that connects individuals, businesses, professionals and consumers through virtual imagery, said virtual-imagery and video-based social media networking system comprising:
    a web server computer that hosts a virtual-imagery and video-based social media networking cloud service, wherein the virtual-imagery and video-based social media networking cloud service provides a home login page comprising (i) login fields for user input of user credentials, (ii) a transparent and looped feature video in a background layer of the home login page, and (iii) a plurality of looped advertisement slots presented in a plurality of small windows that encapsulate and highlight video clips of different businesses, various consumers, and various professionals;
    a video and video link database comprising videos and video feeds that are stored in connection with exposures of end-users;
    a multi-channel video-feed streaming server that is communicably connected to the web server computer and the video and video link database, wherein the multi-channel video-feed streaming server is configured to retrieve, upon request by the web server computer, a plurality of video feeds from the video and video link database and transfer the retrieved plurality of video feeds to increase virtual exposures to offerings of non-connection entities, wherein the plurality of video feeds comprises a first connection-based video feed and a second non-connection based video feed;
    an imagery database comprising images that are stored in connection with exposures of end-users;
    a virtual imagery management server that is communicably connected to the web server computer and the imagery database, wherein the virtual imagery management server is configured to retrieve, upon request by the web server computer, images from the imagery database and transfer the retrieved images;
    a posted user exposure database that stores references to videos and images included in exposures of end-users; and
    a plurality of end-user devices each comprising an application with a user interface (UI) and configured to connect to the web server computer to access the home login page provided by the virtual-imagery and video-based social media networking cloud service to view and post exposures that drive traffic to particular web resources, wherein the UI comprises video capture, upload, and edit tools that are configured to provide a video editor for users to edit videos and video feeds stored in the video and video link database.

2. The virtual-imagery and video-based social media networking system of claim 1, wherein the video and video link database further comprises links to videos associated with exposures.

3. The virtual-imagery and video-based social media networking system of claim 2, wherein a particular video stored in the video and video link database is associated with a reference to the particular video in the posted user exposure database.

4. The virtual-imagery and video-based social media networking system of claim 1, wherein the imagery stored in the imagery database includes image files comprising at least one of photos and computer generated imagery.

5. The virtual-imagery and video-based social media networking system of claim 4, wherein a particular image file stored in the imagery database is associated with a reference to the particular image file in the posted user exposure database.

6. The virtual-imagery and video-based social media networking system of claim 1, wherein a first end-user device in the plurality of end-user devices comprises a device of a professional user and a second end-user device in the plurality of end-user devices comprises a mobile device of a consumer.

7. The virtual-imagery and video-based social media networking system of claim 6, wherein the first end-user device stores the application on a non-transitory computer readable medium of the first end-user device, wherein the application presents the UI on a screen of the first end-user device when the application runs on a processing unit of the first end-user device, wherein the UI presents one page at a time as selected by a first end-user operating the first end-user device among a plurality of pages.

8. The virtual-imagery and video-based social media networking system of claim 7, wherein the plurality of pages comprise:

the home login page comprising the transparent and looped feature video in the background layer of the home login page, a login section that accepts textual user input of user credentials in the login fields, and the plurality of looped advertisement slots presented in the plurality of small windows that encapsulate and highlight video clips of different businesses, various consumers, and various professionals;

a main profile page comprising a host-featured business-of-the-month that is displayed as a looped video, a plurality of featured video clips, and a search option displayed in a top right corner of the main profile page and which allows a user to provide textual input to search by at least one of city/state textual information, business name, consumer name, professional field or name textual information, and industry name, wherein the plurality of featured video clips are displayed in a plurality of different windows in which ad space is featured for one or more of a business, a consumer, and a professional, wherein posting of user-provided video clips are shown in a double infinite scroll whereby a user can post content, in a my-videos section, wherein the user-posted content comprises content related to one or more of general topics, businesses, consumers, and professionals, wherein the main profile page further includes a view option that is provided with an indicator that reflects a number of views the clip/highlight received and which shows the number of views, wherein the main profile page further includes a share option with tools to allows users to email and share on other social media platforms, wherein the main profile page further includes a like option with an indicator that allows people to like it and which shows a number of likes, wherein the main profile page further includes a video response and reply section which includes a bubble indicator to reflect a video response option, wherein the main profile page further includes a global redirection to a website or a URL, wherein the main profile page further includes a comment/reply section which shows a number of comments and which is public or private; and a user driven home page comprising user driven financial and non-financial rewards, incentives, in-app/site tipping options, a rating scale that supports user driven rewards, incentives and in-app/site tipping, video editing, product purchase option shopping cart, a private messages section, a notification and emails section, a setting section, informational sections, options to invite and share with friends, an all users tab, and an all businesses tab.

9. The virtual-imagery and video-based social media networking system of claim 8, wherein the second end-user device stores the application on a particular non-transitory computer readable medium of the second end-user device, wherein the application presents the UI on a particular screen of the second end-user device when the application runs on a mobile processing unit of the second end-user device, wherein the UI presents one or more exposures among a plurality of exposures posted by the first end-user via the first end-user device, wherein each exposure in the plurality of first end-user exposures includes at least one of a video and an image, wherein the UI includes a video player tool that scales and plays the video when a second end-user operating the second end-user device selects an image associated with a particular exposure that corresponds to the video, wherein the UI includes an image viewer tool that displays the image when the second end-user selects a particular exposure with an image, thereby increasing exposure of the first end-user.

\* \* \* \* \*